United States Patent
Bergman et al.

(10) Patent No.: US 11,688,258 B2
(45) Date of Patent: Jun. 27, 2023

(54) RADIO FREQUENCY IDENTIFICATION (RFID) TAG LOCATION VERIFICATION USING SHORT RANGE COMMUNICATION

(71) Applicant: Sensormatic Electronics, LLC, Boca Raton, FL (US)

(72) Inventors: Adam S. Bergman, Boca Raton, FL (US); Manuel A. Soto, Lake Worth, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 302 days.

(21) Appl. No.: 17/004,926

(22) Filed: Aug. 27, 2020

(65) Prior Publication Data
US 2021/0065529 A1 Mar. 4, 2021

Related U.S. Application Data

(60) Provisional application No. 62/894,682, filed on Aug. 30, 2019.

(51) Int. Cl.
*H04W 4/80* (2018.01)
*G08B 13/24* (2006.01)
(Continued)

(52) U.S. Cl.
CPC ..... *G08B 13/2454* (2013.01); *G06K 7/10366* (2013.01); *G06K 19/0723* (2013.01);
(Continued)

(58) Field of Classification Search
CPC ....... H04W 4/021; H04W 4/029; H04W 4/35; H04W 4/80; H04W 12/126; H04W 12/64;
(Continued)

(56) References Cited

U.S. PATENT DOCUMENTS 10,598,507 B1* 3/2020 Lamont ............. G01C 21/3638
2003/0104848 A1* 6/2003 Brideglall ............ G06K 7/0008
455/574
(Continued)

FOREIGN PATENT DOCUMENTS

WO 2011037604 A1 3/2011
WO 2012023958 A1 2/2012

OTHER PUBLICATIONS

Invitation to Pay Additional Fees for International Patent Application No. PCT/US2020/048644, dated Dec. 10, 2020 (88 pages).

*Primary Examiner* — Dionne Pendleton
(74) *Attorney, Agent, or Firm* — ArentFox Schiff LLP

(57) ABSTRACT

An EAS system first transmits, over a time, a radio frequency identification (RFID) interrogation signal into an RFID interrogation zone of an EAS system. The system then first receives at least one RFID response signal from a first RFID tag of the system responding to the interrogation signal. The system second transmits, over a second time overlapping at least in part with the first time, a non-RFID RF signal into a second zone. The second zone and the RFID interrogation zone overlap to form a zone of interest. The system second receives, from the first RFID tag, an indication that the first RFID tag received the second transmission. The system determines, based on receiving both the RFID response signal from a first RFID tag and the indication that the first RFID tag received the second transmission, that the first RFID tag is in the zone of interest.

18 Claims, 8 Drawing Sheets

(51) Int. Cl.
  *G06K 7/10* (2006.01)
  *H04B 17/318* (2015.01)
  *G06K 19/07* (2006.01)

(52) U.S. Cl.
  CPC ....... *G08B 13/2451* (2013.01); *H04B 17/318* (2015.01); *H04W 4/80* (2018.02)

(58) Field of Classification Search
  CPC .... H04W 12/06; H04W 12/47; H04B 17/318; H04B 1/40; G08B 13/2417; G08B 13/2454; G08B 13/2462; G08B 13/248; G08B 13/2482; G08B 13/183; G08B 13/2411; G08B 13/242; G08B 13/2448; G08B 13/2451; G08B 13/2491; G08B 13/19695; G08B 13/2408; G08B 13/2422; G08B 13/2442; G06K 19/0723; G06K 7/10009; G06K 7/10366; G06K 7/10297; G06K 19/07733; G06K 19/10; G06K 7/0008; G01V 8/10; G01V 8/20; G06F 9/3867; G06F 9/46; G06F 21/44; G06F 21/445; G06F 21/72; G06F 21/86; G01C 21/20; G01C 21/206; G01C 21/3638; G01C 21/365; G06V 20/20; H01Q 1/2225; H01Q 1/2291; H01Q 1/36; H01Q 13/16; H01Q 21/28; H01Q 23/00; H01Q 7/00; H01Q 7/005; H01Q 7/02; H04L 2209/805; H04L 63/0869; H04L 9/0894; H04L 9/3242

See application file for complete search history.

(56) References Cited

U.S. PATENT DOCUMENTS

| | | | |
|---|---|---|---|
| 2011/0068906 A1* | 3/2011 | Shafer | G06K 7/10475 340/10.3 |
| 2019/0043328 A1* | 2/2019 | Thomas | G08B 13/2474 |
| 2019/0173180 A1* | 6/2019 | Kai | H01Q 21/28 |
| 2020/0257792 A1* | 8/2020 | Rivard | G06F 21/445 |

\* cited by examiner

510 — First transmitting, over a first window of time, a radio frequency identification (RFID) interrogation signal into an RFID interrogation zone of an electronic article surveillance (EAS) system.

↓

520 — First receiving at least one RFID response signal from a first RFID tag of the EAS system responding to the interrogation signal.

↓

530 — Second transmitting, over a second window of time overlapping at least in part with the first window of time, a non-RFID RF signal into a second zone, the second zone and the RFID interrogation zone overlapping to form a zone of interest.

↓

540 — Second receiving, from the first RFID tag, an indication that the first RFID tag received the second transmission.

↓

550 — Determining, based on receiving both the at least one RFID response signal from a first RFID tag of the EAS system responding to the interrogation signal and the indication that the first RFID tag received the second transmission, that the first RFID tag is in the zone of interest.

700

First transmitting, over a first window of time, a radio frequency identification (RFID) interrogation signal into an RFID interrogation zone of an electronic article surviellance (EAS) system.
510

First receiving at least one RFID response signal from a first RFID tag of the EAS system responding to the interrogation signal.
520

Second transmitting, over a second window of time overlapping at least in part with the first window of time, a non-RFID RF signal into a second zone, the second zone and the RFID interrogation zone overlapping to form a zone of interest.
530

Second receiving, from the first RFID tag, an indication that the first RFID tag received the second transmission.
540

Determining, based on receiving both the at least one RFID response signal from a first RFID tag of the EAS system responding to the interrogation signal and the indication that the first RFID tag received the second transmission, that the first RFID tag is in the zone of interest.
550

Alarming in response to determining that the first RFID tag is in the zone of interest.
760

FIG. 7

RADIO FREQUENCY IDENTIFICATION (RFID) TAG LOCATION VERIFICATION USING SHORT RANGE COMMUNICATION

CROSS-REFERENCE TO RELATED APPLICATIONS

This application claims the benefit of U.S. Provisional Application No. 62/894,682, entitled "Positional Validation of RFID Tags Detected in Electronic Article Surveillance Systems using Bluetooth," filed Aug. 30, 2019, which is expressly incorporated by reference herein in its entirety.

BACKGROUND

Technical Field

The present disclosure relates generally to Electronic Article Surveillance (EAS). Examples related to EAS using a Radio Frequency Identification (RFID) tag with tag location verified by short range communication including personal area network (PAN) short range communication.

Introduction

EAS systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm.

A personal area network (PAN) is a computer network for interconnecting electronic devices centered on an individual person's workspace. A PAN provides data transmission among devices such as computers, smartphones, tablets, and personal digital assistants. PANs can be used for communication among the personal devices themselves, or for connecting to a higher level network and the Internet where one master device takes up the role as gateway. A PAN may be wireless or carried over wired interfaces such as USB. A wireless personal area network (WPAN) is a PAN carried over a low-powered, short-distance wireless network technology such as IrDA, Wireless USB, Bluetooth including (Bluetooth Low Energy (LE)), or ZigBee. The reach of a WPAN varies from a few centimeters to a few meters.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and tags of electronic article surveillance (EAS). In some methods, an EAS system first transmits, over first window of time, a radio frequency identification (RFID) interrogation signal into an RFID interrogation zone of an EAS system. The EAS system then first receives at least one RFID response signal from a first RFID tag of the EAS system responding to the interrogation signal. The EAS system second transmits, over a second window of time overlapping at least in part with the first window of time, a non-RFID RF signal into a second zone. The second zone and the RFID interrogation zone overlap to form a zone of interest. The EAS system second receives, from the first RFID tag, an indication that the first RFID tag received the second transmission. The EAS system determines, based on receiving both the at least one RFID response signal from a first RFID tag of the EAS system responding to the interrogation signal and the indication that the first RFID tag received the second transmission, that the first RFID tag is in the zone of interest.

In some examples, the second transmitting is in response to the first receiving. In such examples, first receiving further includes determining that the first RFID tag is not authorized to be in the RFID interrogation zone. In those examples, the second transmitting occurs only in response to determining that the first RFID tag is not authorized to be in the RFID interrogation zone. In some such examples, the EAS system alarms in response to determining that the first RFID tag is in the zone of interest.

In some examples, the non-RFID RF signal is a personal area network (PAN) signal. In some such examples, the PAN is a Bluetooth PAN. In some such examples, determining is further based on a received signal strength indicator (RSSI) of the first tag.

In some examples, the indication that the first RFID tag received the second transmission comprises one of an information element in the RFID response signal, and a received non-RFID response signal from the first tag in response to the non-RFID RF signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

BRIEF DESCRIPTION OF THE DRAWINGS

FIG. 5 is a flow chart of a method of electronic article surveillance, in accordance with examples of the technology disclosed herein.

FIG. 7 is a flow chart of a method of electronic article surveillance, in accordance with examples of the technology disclosed herein.

DETAILED DESCRIPTION

Figure 1:
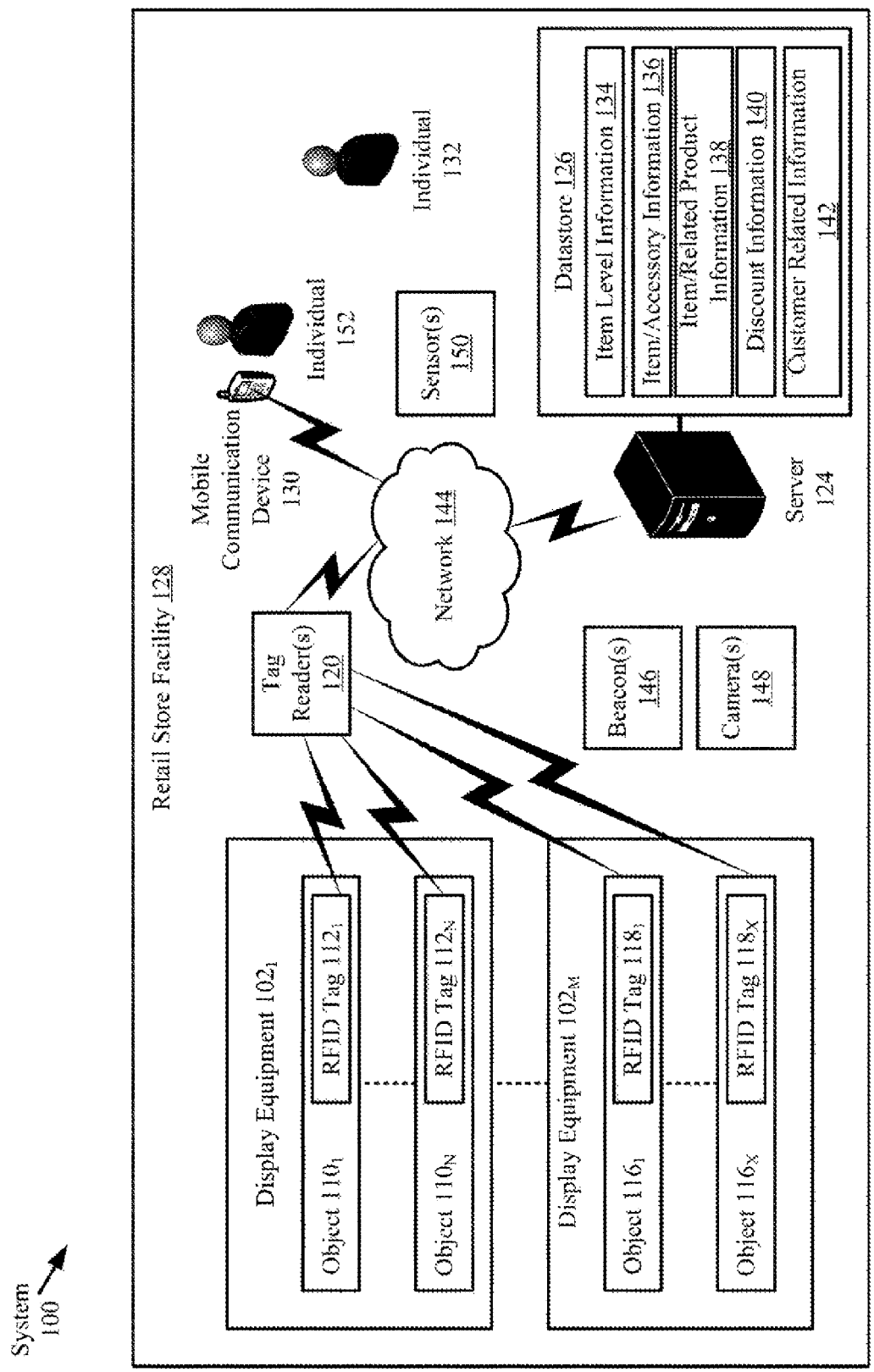
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution therefore is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In the retail industry, it is common to "source tag" merchandise with RFID tags, either at the time of packaging/manufacture, or at some other point in the in the supply chain. At the same time, electronic article surveillance (EAS) technology and devices have proven critical to the reduction of theft and so called "shrinkage." Since many items arrive at the retailer with RFID tags, it is desirable that RFID tag be used also to provide EAS functionality in addition to their intended function of providing capabilities such as inventory control, shelf reading, non-line of sight reading, etc.

Currently, using RFID as an EAS exit solution is limited by stray or reflected alarms when transmission powers are increased. People walking through the EAS portal may trigger alarms even if they are not removing merchandise from the premises without authorization. Alarms can be caused by stationary RFID tags located some distance from the exit. Further, such an approach limits the ability for the retailer to place merchandise too close to the exit system due to false alarms. The large read ranges of the RFID technology coupled with RF reflections makes it very difficult to control the RFID system's detection area at the exit.

Bluetooth LE is wireless personal area network (WPAN) technology with use cases in the healthcare, fitness, beacons, security, and home entertainment industries. Bluetooth LE is independent of Bluetooth BR/EDR, but BR/EDR and LE can coexist. Compared to classic Bluetooth, Bluetooth LE is intended to provide reduced power consumption. Advantages include low power requirements, operating for "months or years" on a button cell, small size and low cost, and compatibility with a large installed base of mobile phones, tablets and computers. Certain Bluetooth LE capabilities allow physical proximity to a Bluetooth LE transmitter (e.g., a beacon) to be estimated using the radio receiver's Received Signal Strength Indicator (RSSI) value.

Examples of the technology disclosed herein can utilize a short range radio frequency (RF) signal, e.g., a Bluetooth LE beacon, at the exit point to validate the position of the RFID tag when the RFID tag causes an EAS event at the portal. Such solutions can logically AND the RFID signal response with event data indicators derived from short range (or rangeable) signals. This advantageously reduces false alarms, and at the same time can allow for reduced RFID transmission power.

These and other features of the present disclosure are discussed in detail below with regard to FIGS. 1-8.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures, and/or equipment se-curing areas of the RSF 128. The RSF can also include emergency equipment (not shown), checkout counters, video cameras, people counters, and conventional EAS systems are well known in the art, and therefore will not be described herein.

At least one tag reader 120 is provided to assist in counting and tracking locations the objects $110_1$-$110_N$, $116_1$-$116_X$ within the RSF 128. The tag reader 120 comprises an RFID reader configured to read RFID tags. RFID readers are well known in the art, and therefore will be described at a sufficient level of detail below for understanding of the claimed invention.

RFID tags $112_1$-$112_N$, $118_1$-$118_X$ are respectively attached or coupled to the objects $110_1$-$110_N$, $116_1$-$116_X$. This coupling is achieved via an adhesive (e.g., glue, tape, or sticker), a mechanical coupler (e.g., straps, clamps, snaps, etc.), a weld, chemical bond, or other means. The RFID tags can alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $110_1, \ldots, 110_N, 116_1, \ldots, 116_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags $112_1$-$112_N$, $118_1$-$118_X$ from the objects $110_1, \ldots, 110_N, 116_1, \ldots, 116_X$; and/or facilitate the detachment of an anchored chain or cable from the objects $110_1, \ldots, 110_N, 116_1, \ldots, 116_X$.

The MCD 130 is generally configured to provide a visual and/or auditory output of item level information 134, accessory information 136, related product information 138, discount information 140 and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount in-formation can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $112_1$-$112_N$, $118_1$-$118_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112/118 response to the second RF signal is analyzed and compared to data collected by the RFID signal response that occurred concurrently with the tag's passage through the portal.

Examples of the technology disclosed herein include methods, systems, and tags of electronic article surveillance (EAS). In some methods, an EAS system first transmits, over first window of time, a radio frequency identification (RFID) interrogation signal into an RFID interrogation zone of an EAS system. The EAS system then first receives at least one RFID response signal from a first RFID tag of the EAS system responding to the interrogation signal. The EAS system second transmits, over a second window of time overlapping at least in part with the first window of time, a non-RFID RF signal into a second zone. The second zone and the RFID interrogation zone overlap to form a zone of interest. The EAS system second receives, from the first RFID tag, an indication that the first RFID tag received the second transmission. The EAS system determines, based on receiving both the at least one RFID response signal from a first RFID tag of the EAS system responding to the interrogation signal and the indication that the first RFID tag received the second transmission, that the first RFID tag is in the zone of interest.

In some examples, the second transmitting is in response to the first receiving. In such examples, first receiving further includes determining that the first RFID tag is not authorized to be in the RFID interrogation zone. In those examples, the second transmitting occurs only in response to determining that the first RFID tag is not authorized to be in the RFID interrogation zone. In some such examples, the EAS system alarms in response to determining that the first RFID tag is in the zone of interest.

In some examples, the non-RFID RF signal is a personal area network (PAN) signal. In some such examples, the PAN is a Bluetooth PAN. In some such examples, determining is further based on a received signal strength indicator (RSSI) of the first tag.

In some examples, the indication that the first RFID tag received the second transmission comprises one of an information element in the RFID response signal, and a received non-RFID response signal from the first tag in response to the non-RFID RF signal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is (are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship in-formation (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
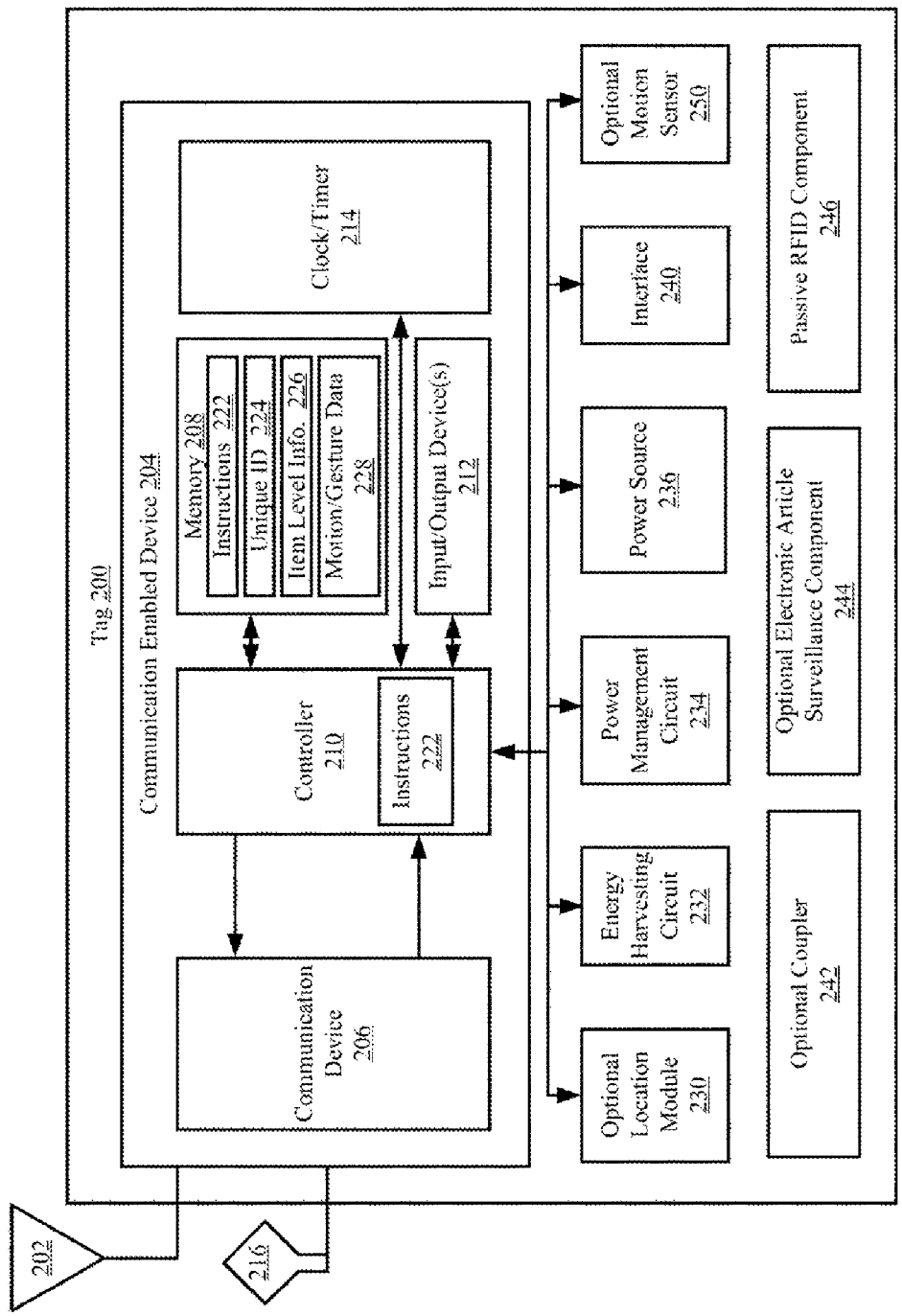
FIG. 2 is an illustration of an illustrative architecture for a tag.

Referring now to FIG. 2, there is an illustration of an illustrative architecture for a tag 200. RFID tags $112_1$, ..., $112_N$, $118_1$, ..., $118_X$ are the same as or similar to tag 200. As such, the discussion of tag 200 is sufficient for understanding the RFID tags $112_1$, ..., $112_N$, $118_1$, ..., $118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external de-vice and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled de-vice 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic lo-cation can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s) he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The pre-sent solution is not limited in this regard.

In some examples, tag 200 includes an RFID subsystem, such as communication-enabled device 204 described above, operative to receive an RFID interrogation signal and respond with an RFID response. Such tags 200 include a non-RFID RF subsystem, also incorporated into communication enabled device 204, operative to receive a non-RFID RF signal and respond by wirelessly indicating that the non-RFID subsystem received the non-RFID RF signal. In some such examples, the non-RFID subsystem responds that the non-RFID RF subsystem received the non-RFID RF signal by one of: allowing the RFID subsystem to respond to the RFID interrogation signal with an RFID response only upon the non-RFID RF subsystem having received a non-RFID RF signal concurrently; supplementing the RFID response with at least one information element indicating that the non-RFID RF subsystem received the non-RFID RF signal; and separately transmitting a non-RFID response. In some such examples, the non-RFID RF subsystem is a personal area network (PAN) signal. In some such examples, the PAN is a Bluetooth PAN.

Figure 3:
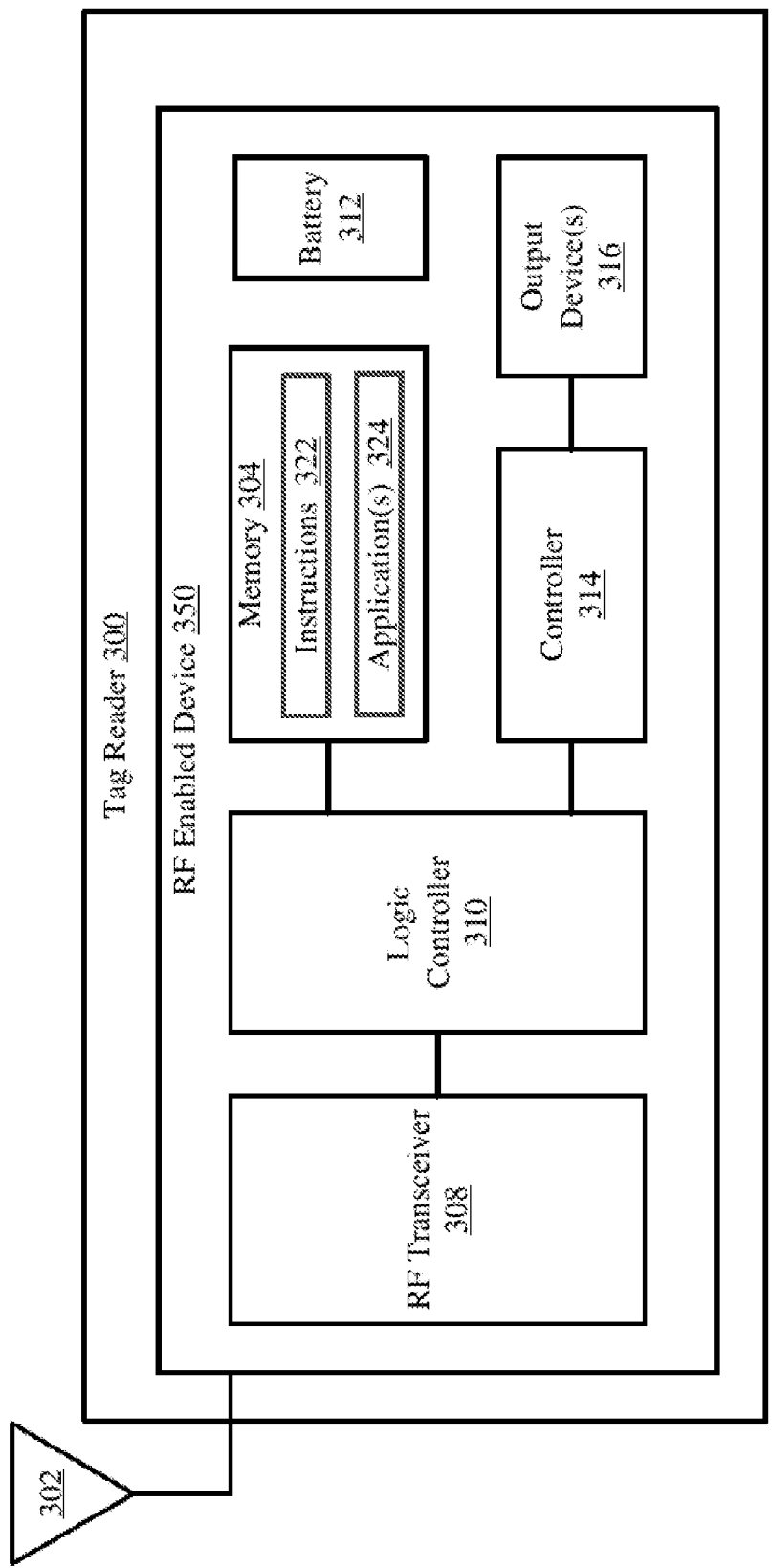
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is (are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in zone of a second RF signal (e.g., a Bluetooth beacon or NFC or other SRC system). Other functions of the RF enabled device 350 will become apparent as the discussion progresses.

Figure 4:
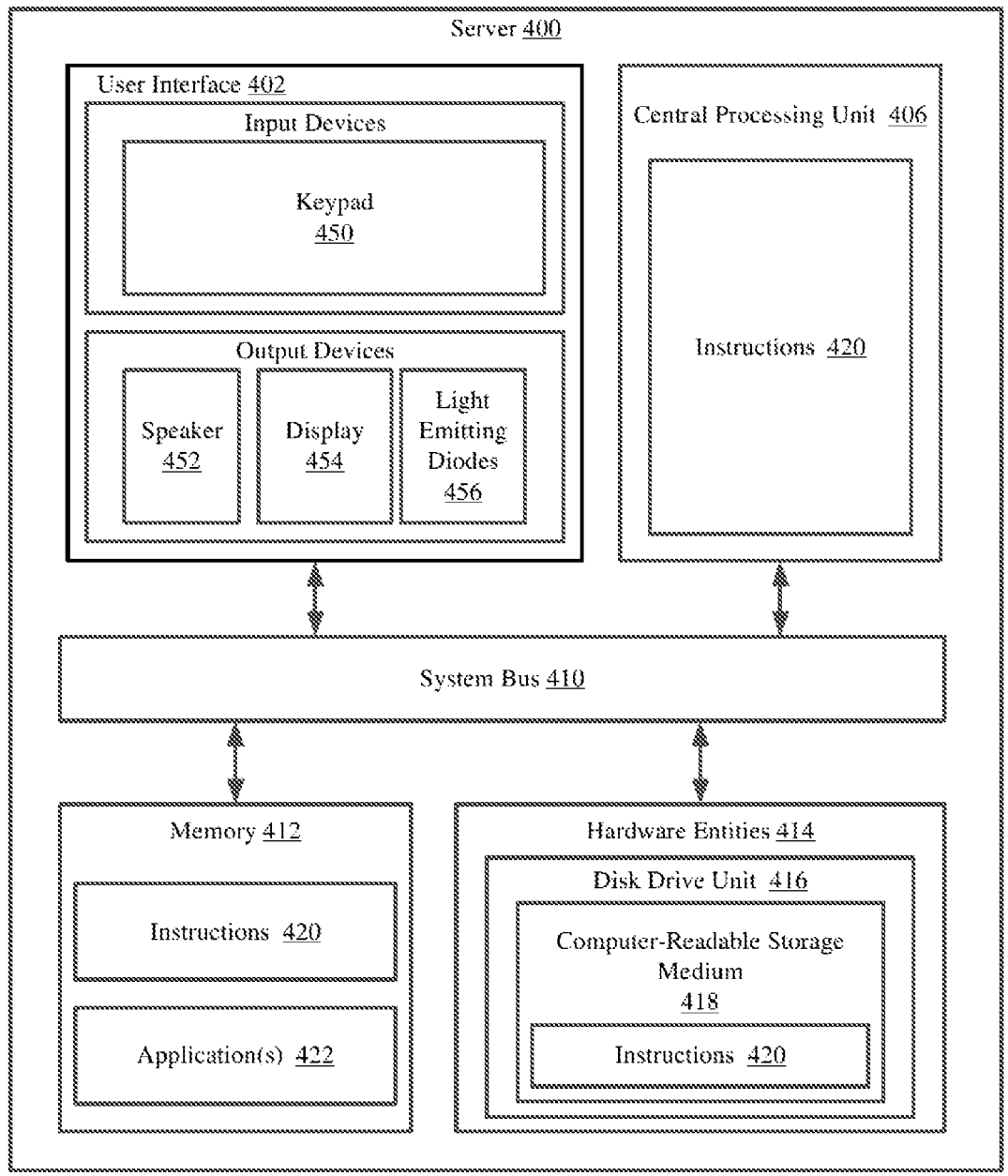
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences. As such, the server 400 of FIG. 4 implements at least a portion of some methods for EAS, in which an EAS system 100 determines, based on receiving both at least one RFID response signal from a first RFID tag of the EAS system responding to an RFID interrogation signal and an indication that the first RFID tag received a second non-RFID RF transmission, that the first RFID tag is in a zone of interest.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate the determination of RFID tag locations within a facility; the direction of travel of RFID tags in motion; and the mapping of the RFID tag locations and movements in a virtual three-dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

Figure 6:
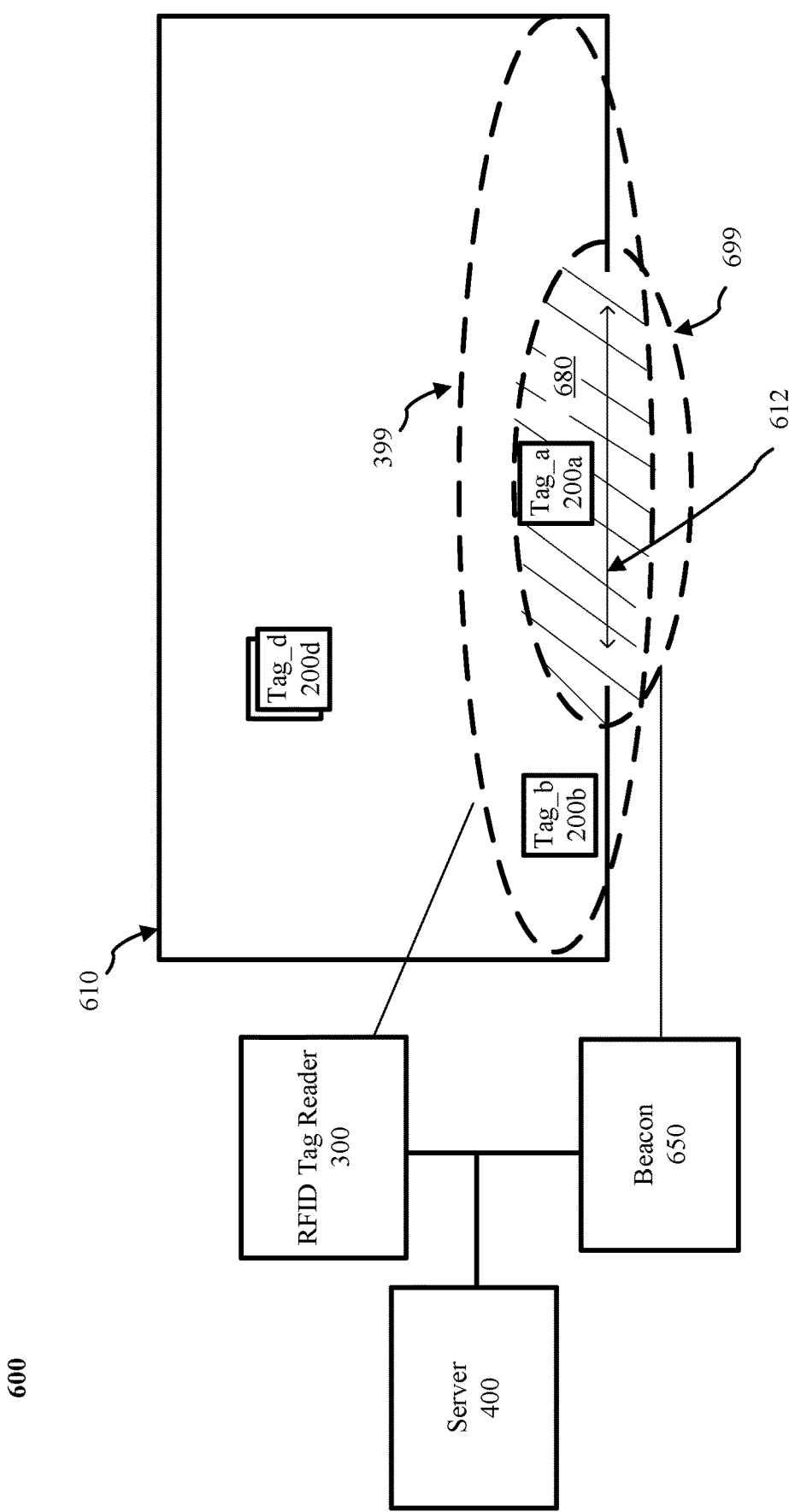
FIG. 6 is an illustration of an architecture, in accordance with examples of the technology disclosed herein.
Figure 8:
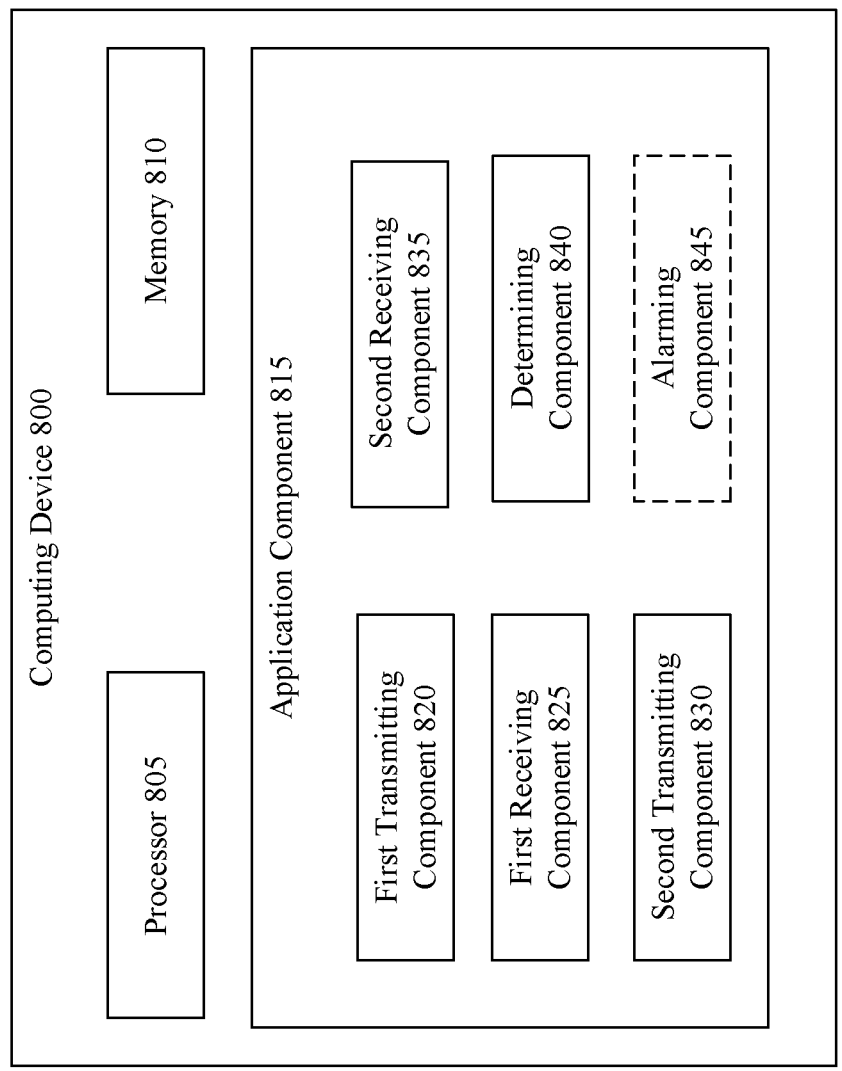
FIG. 8 is an illustration of a computing device including components for performing the function of examples of the technology disclosed herein.

Referring to FIG. 5, FIG. 6, and FIG. 8, in operation, system 100 may perform a method 500 of electronic article surveillance, by such as via execution of application component 815 by processor 805 and/or memory 810—wherein application component 815, processor 805, and/or memory 810 are components of computing device 800. Computing device 800 can be one or more of tag 200, tag reader 300, and server 400.

An EAS system can first transmit, over a first window of time, an RFID interrogation signal into an RFID interrogation zone of an EAS system—Block 510. In a continuing example, EAS system 600 (for example system 100) includes RFID tag reader 300 (for example tag reader 120) that transmits an RFID interrogation signal into interrogation zone 399 in facility 610 (for example retail store facility 128) covering substantially the front one third of the facility 610 including entry/exit 612. This positions RFID tag reader 300 such that any operative tag of the system present in the interrogation zone 399 during transmission of the interrogation signal will respond per the system 600 protocol.

In a further example, referring to FIG. 8, computer device 800, processor 805, memory 810, application component 815, and/or first transmitting component 820 may be configured to or may comprise means for first transmitting, over a first window of time, an RFID interrogation signal into an RFID interrogation zone of an EAS system.

The EAS system can first receive at least one RFID response signal from a first RFID tag of the EAS system responding to the interrogation signal—Block 520. In the continuing example, any tag 200 (such as tag 200*a*) attached to a retail store product that is leaving the retail facility 610 is detected through the RFID interrogation zone—but so will tag 200*b* (which is attached to a retail store product on display and not leaving the retail facility 610). The RFID response signal from tag 200*a*, as it is leaving the store, varies in signal strength; while the strength of the RFID response signal from tag 200*b* stays fairly constant.

In some examples, the RFID response itself contains a received signal strength indicator (RSSI) information element describing the strength of the RFID interrogation signal as that signal is received from the RFID tag reader 300. The RSSI information (both for the RFID signal and for non-RFID signals) can be used, as described below, in determining whether a tag 200*a* is in the zone of interest. In some examples, the detecting further comprises detecting that the tag is not authorized to be in the RFID interrogation zone. For example, only tags that are not authorized to be in the RFID interrogation zone are considered. In such examples, response signals from tags that are authorized, for example by completion of a purchase transaction of the article to which the tag is attached, will be ignored after being detected.

In the further example of FIG. 8, computer device 800, processor 805, memory 810, application component 815, and/or first receiving component 825 may be configured to or may comprise means for first receiving at least one RFID response signal from a first RFID tag of the EAS system responding to the interrogation signal.

Over a second window of time overlapping at least in part with the first window of time, the EAS system transmits a non-RFID RF signal into a second zone, the second zone and the RFID interrogation zone overlapping to form a zone of interest—Block 530. In the continuing example, a beacon 146 such as Bluetooth LE beacon 650 of the EAS system 600 broadcasts (into the second zone 699) its universally unique identifier (and possibly several bytes) to be picked up by an EAS system 600 tag 200 (that includes at least a Bluetooth LE receiver, e.g., as part of communication enabled device 204). The RFID interrogation zone 399 and second zone 699 overlap across entry/exit 612 to form zone of interest 680. In some examples, the capturing is in response to the detecting.

In the further example of FIG. 8, computer device 800, processor 805, memory 810, application component 815, and/or second transmitting component 830 may be configured to or may comprise means for second transmitting, over a second window of time overlapping at least in part with the first window of time, a non-RFID RF signal into a second zone, the second zone and the RFID interrogation zone overlapping to form a zone of interest.

The EAS system second receives, from the first RFID tag, an indication that the first RFID tag received the second transmission—Block 540. In the continuing example, tag 200*a* in the zone of interest 680 had received both the first transmission and the second transmission. As part of the RFID response from tag 200*a*, tag 200*a* included the universal unique identifier of beacon 650 along with an RSSI for the received second transmission. In other examples, reception of the second transmission operates as a gating function in tag 200*a* to allow the RFID response to be sent—thus a tag reader 300 receiving the RFID response knows that the tag 200*a* was in the zone of interest 680; while the RFID response of tag 200*b*, outside the zone of interest, does not include the identifier of beacon 650. In other examples, tag 200 includes a separate non-RFID RF transmitter, but such examples are suboptimal and lose some of the advantage of other examples.

In the further example of FIG. 8, computer device 800, processor 805, memory 810, application component 815, and/or second receiving component 835 may be configured to or may comprise means for receiving, from the first RFID tag, an indication that the first RFID tag received the second transmission.

The EAS system can determine based on receiving both the at least one RFID response signal from a first RFID tag of the EAS system responding to the interrogation signal and the indication that the first RFID tag received the second transmission, that the first RFID tag is in the zone of interest—Block 550. In the continuing example, the server 400 receives the RFID response including the beacon 650 universal unique identifier and the RSSI of the second transmission at tag 200*a*, and determined that tag 200*a* was in the zone of interest 680. In some examples, where the RSSI is below a threshold value, server 400 does not consider that the tag 200 was in the zone of interest 680.

In the further example of FIG. 8, computer device 800, processor 805, memory 810, application component 815, and/or determining component 840 may be configured to or may comprise means for determine based on receiving both the at least one RFID response signal from a first RFID tag of the EAS system responding to the interrogation signal and the indication that the first RFID tag received the second transmission, that the first RFID tag is in the zone of interest.

Referring to FIG. 6, FIG. 7, and FIG. 8, in some examples of the technology disclosed herein, the EAS system alarming in response to determining that the first RFID tag is in the zone of interest—Block 660. In such examples, Block 510—Block 550 are performed as described above. In the continuing example, the RFID tag response including the indication of the beacon 650 universal unique identifier and the RSSI of the second transmission at tag 200*a* cause the EAS system to alarm. In some embodiments, the EAS system interfaces with a point of sale system (not shown) of the facility 610 to determine whether a product to which tag 200*a* was attached has been purchased or otherwise authorized to leave the facility. If not, then the determination that tag 200*a* was in the zone of interest 680 results in an alarm.

In the further example of FIG. 8, computer device 800, processor 805, memory 810, application component 815, and/or alarming component 845 may be configured, or may comprise means for, alarming in response to determining that the first RFID tag is in the zone of interest.

Some examples of the technology disclosed herein include an electronic article surveillance (EAS) system using a Bluetooth beacon at the exit point to validate the position of the RFID tag after the RFID causes an EAS event at the portal. This advantageously reduces false alarms, and at the same time allows for reduced transmission powers.

In some examples, the technology includes an EAS tag having a passive RFID element is disposed in the tag housing. The passive RFID element is responsive to an RFID interrogation field applied at the EAS portal, and is operable to generate an encoded RF signal, which is interpreted as an EAS response in the event of unauthorized passage through the portal.

In some examples, the technology further includes one or more SRC beacons positioned at exit points proximate the EAS portal. The one or more SRC beacons are installed at fixed, known positions. Once initiated, the SRC beacon system is configured to continuously generate at predetermined intervals a radio beacon transmission compliant with a short range wireless communication standard (e.g. a Bluetooth data communication standard). The continuously generated beacon transmission is initiated in response to a beacon enable signal. At least one wireless transmission is used to initiate the beacon enable signal. The radio beacon transmission described herein includes a unique identifier used assigned to each of the one or more beacons, where the identifier can server to associate the beacon with its fixed, known position.

In some examples, the beacon enablement signal can be transmitted by a wireless communication module disposed in the EAS tag. The wireless technology can include, but is not limited to, Short Range Communication ("SRC") technology and RFID technology. The SRC technology includes, but is not limited to, Bluetooth technology, and more particularly can include Bluetooth Low Energy (BLE) technology. Bluetooth is a standard data communications protocol designed for low-power consumption, with a short range (e.g., less than 100 meters) based on low-cost transceiver microchips. BLE extends the use of Bluetooth wireless technology so as to consume much less power as compared to radios that conform to a basic Bluetooth standard. BLE practically facilitates the use of Bluetooth wireless technology in devices powered by small, coin-cell batteries.

In some examples, when an RFID portal associated with a retail store detects that an EAS tag is departing from the retail store without authorization, the system can respond by automatically activating the SRC beacon. In one embodiment, this can be accomplished by setting a session flag in the RFID element. The session flag can then be used as a beacon enable signal sent from the tag to activate SRC beacon transmissions from the one or more SRC beacons.

Alternatively, the beacon activation signal can be transmitted from the components installed within the EAS portal, or from one or more transmission nodes in communication with the EAS portal. Once the beacon enable signal is transmitted, the one or more SRC beacons commence signal transmission. If there are multiple SRC beacons, each signal can include the unique identifier indicating a particular SRC beacon's position. The Bluetooth Beacon Gateway receives the beacon signal, and the position information is compared to the RFID response.

By logically "ANDing" the RFID response with a Bluetooth signal, the position of the sensor can be determined. A beacon would be placed at the exit of the store. Only when both the BT and RFID signal thresholds were achieved, would the exit alarm sound.

In some examples, an EAS system includes an EAS portal at the exit point of a protected area and an EAS tag. The EAS tag includes a tag housing, an RFID element disposed in the tag housing, and which is responsive to an RFID interrogation field applied at the EAS portal to generate an encoded RF signal indicating a first EAS event if the movement of the tag through the portal is unauthorized. The system further includes a short range communication (SRC) beacon system including one or more SRC beacons fixedly installed near the exit point for generates an SRC radio beacon transmission in response to a beacon enable signal generated in response to the first EAS event associated with the EAS tag. In such examples, the SRC radio beacon transmission is received by a radio receiver in communication with the EAS portal, the reception of the beacon transmission indicating that the tag is in proximity of the exit, the EAS portal interpreting the beacon transmission as a second EAS event associated with the EAS tag. In such examples, the EAS portal generates an EAS alarm event only if the first EAS event and the second EAS event are generated within a predefined time interval. In some such examples, the EAS system is arranged to generate at least one wireless transmission that initiates the beacon enable signal in response to the EAS alarm event.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A electronic article surveillance (EAS) system, comprising:
   an EAS tag reader operative to:
      first transmit, over a first window of time, a radio frequency identification (RFID) interrogation signal into an RFID interrogation zone of an EAS system,
      first receive at least one RFID response signal from a first EAS tag of the EAS system responding to the interrogation signal;
      second transmit, over a second window of time overlapping at least in part with the first window of time, a non-RFID RF signal into a second zone, the second zone and the RFID interrogation zone overlapping to form a zone of interest; and
      second receive, from the first EAS tag, an indication that the first EAS tag received the second transmission; and
   at least one processor:
      in communication with the EAS tag reader; and
      operative to:
         determine, based on receiving both the at least one RFID response signal from a first RFID tag of the EAS system responding to the interrogation signal and the indication that the first RFID tag received the second transmission, that the first RFID tag is in the zone of interest.

2. The system of claim 1, wherein the second transmitting is in response to the first receiving.

3. The system of claim 2, wherein:
the first receiving further comprises determining that the first RFID tag is not authorized to be in the RFID interrogation zone; and
the second transmitting occurs only in response to determining that the first RFID tag is not authorized to be in the RFID interrogation zone.

4. The system of claim 3, further comprising, alarming in response to determining that the first RFID tag is in the zone of interest.

5. The system of claim 1, wherein the non-RFID RF signal is a personal area network (PAN) signal.

6. The system of claim 5, wherein the PAN is a Bluetooth PAN.

7. The system of claim 5, wherein determining is further based on a received signal strength indicator (RSSI) of the first tag.

8. The system of claim 1, wherein the indication that the first RFID tag received the second transmission comprises one of: an information element in the RFID response signal, and a received non-RFID response signal from the first tag in response to the non-RFID RF signal.

9. A method of electronic article surveillance (EAS), comprising:
first transmitting, over a first window of time, a radio frequency identification (RFID) interrogation signal into an RFID interrogation zone of an EAS system,
first receiving at least one RFID response signal from a first RFID tag of the EAS system responding to the interrogation signal;
second transmitting, over a second window of time overlapping at least in part with the first window of time, a non-RFID RF signal into a second zone, the second zone and the RFID interrogation zone overlapping to form a zone of interest;
second receiving, from the first RFID tag, an indication that the first RFID tag received the second transmission; and
determining, based on receiving both the at least one RFID response signal from a first RFID tag of the EAS system responding to the interrogation signal and the indication that the first RFID tag received the second transmission, that the first RFID tag is in the zone of interest.

10. The method of claim 9, wherein the second transmitting is in response to the first receiving.

11. The method of claim 10, wherein:
the first receiving further comprises determining that the first RFID tag is not authorized to be in the RFID interrogation zone; and
the second transmitting occurs only in response to determining that the first RFID tag is not authorized to be in the RFID interrogation zone.

12. The method of claim 11, further comprising, alarming in response to determining that the first RFID tag is in the zone of interest.

13. The method of claim 9, wherein the non-RFID RF signal is a personal area network (PAN) signal.

14. The method of claim 13, wherein the PAN is a Bluetooth PAN.

15. The method of claim 13, wherein determining is further based on a received signal strength indicator (RSSI) of the first tag.

16. The method of claim 9, wherein the indication that the first RFID tag received the second transmission comprises one of: an information element in the RFID response signal, and a received non-RFID response signal from the first tag in response to the non-RFID RF signal.

17. An electronic article surveillance (EAS) tag, comprising:
an RFID subsystem operative to receive an RFID interrogation signal and respond with an RFID response; and
a non-RFID RF subsystem, operative to receive a non-RFID RF signal and respond by wirelessly indicating that the non-RFID subsystem received the non-RFID RF signal,
wherein the non-RFID subsystem responds that the non-RFID RF subsystem received the non-RFID RF signal by one of:
allowing the RFID subsystem to respond to the RFID interrogation signal with an RFID response only upon the non-RFID RF subsystem having received a non-RFID RF signal concurrently;
supplementing the RFID response with at least one information element indicating that the non-RFID RF subsystem received the non-RFID RF signal; and
separately transmitting a non-RFID response.

18. The EAS tag of claim 17, wherein the non-RFID RF subsystem is a personal area network (PAN) signal.

* * * * *